June 13, 1933.  R. C. WOLFE  1,913,866
WATER COOLER
Filed July 22, 1931
Fig.1
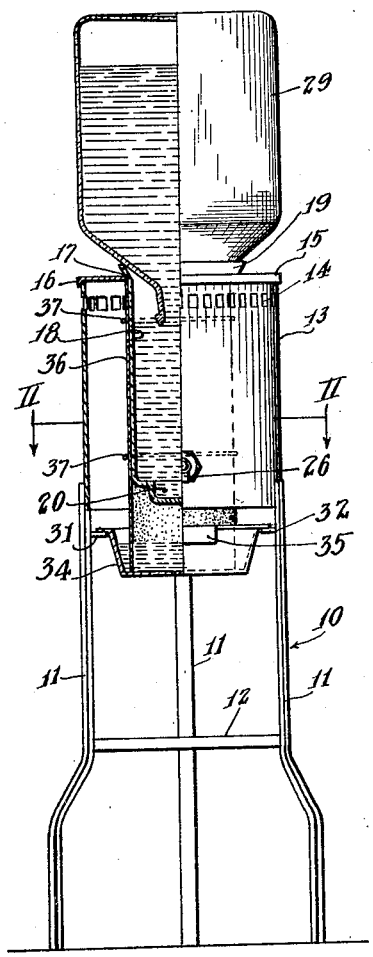
Fig.2
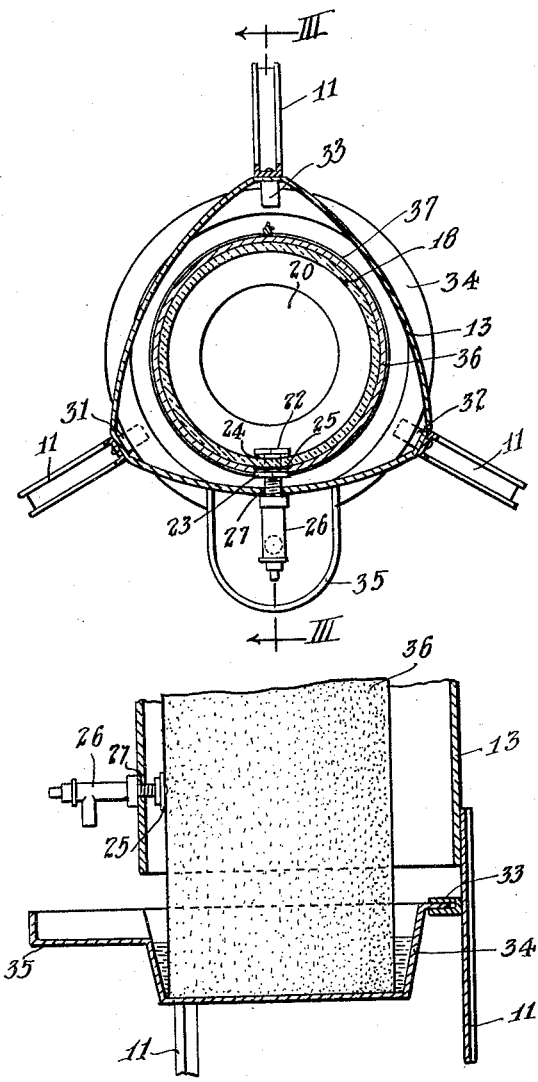
Fig.3
Inventor
Richard C. Wolfe
By Lyon & Lyon
Attorneys Patented June 13, 1933

1,913,866

UNITED STATES PATENT OFFICE

RICHARD C. WOLFE, OF LOS ANGELES, CALIFORNIA, ASSIGNOR TO CALIFORNIA CONSOLIDATED WATER COMPANY, OF LOS ANGELES, CALIFORNIA, A CORPORATION OF DELAWARE

WATER COOLER

Application filed July 22, 1931. Serial No. 552,313.

This invention relates to water coolers and dispensers, and particularly to that type of dispenser in which the contents are cooled by evaporation.

Water coolers or dispensers are widely used in some portions of the country for dispensing water from replaceable storage containers or bottles which are usually of five-gallon capacity and are filled with water of higher quality than is available from the regular piped supply. Incidentally, this bottled water is usually much more expensive than the piped supply.

A popular type of water cooler commonly used comprises a container of burned, unglazed clay of a porous or pervious character into which water from the storage bottle is discharged by gravity. Due to the porous nature of this unglazed clay container, a portion of the drinking water seeps therethrough and evaporates from the outer surface, thereby tending to cool the container and the water within it. A faucet is usually provided in the lower portion of the container for drawing off the water.

Coolers, or ollas as they are sometimes called, of the type described above, have a number of disadvantages. For instance, most, if not all, of the clays of which the ollas are constructed seem to contain natural salts which dissolve in the water as it seeps therethrough and deposit on the outside of the jar as unsightly white or colored efflorescence. These salts may eventually accumulate sufficiently to interfere with the capillary action of the porous jar, thereby reducing the cooling efficiency of the jar as well as spoiling its appearance. Furthermore, algæ and molds multiply inside and outside the jar and in the pores of the clay and are practically impossible to remove; they cause the water to become contaminated, sour and unpleasant to drink.

An appreciable part of the relative expensive bottled water is lost through the seepage and evaporation necessary in the cooling process, which adds to the cost of operating the cooler and also requires it to be filled more often.

As ordinarily constructed, the ollas are not enclosed and therefore they may be heated by the direct radiation of sunlight or by heat radiated from surrounding objects, which are ordinarily at a higher temperature. In addition, the air in an ordinary room or office is quiet, with little natural circulation, so that the maximum evaporation and resultant cooling effect on the water in the olla is not obtained.

An object of this invention is to provide a cooler in which the drinking water to be dispensed is at all times contained in impervious vessels which can be easily and thoroughly cleaned and will not promote the growth of algæ, molds, or bacteria.

Another object of the invention is to provide a cooler that will not become unsightly in appearance and that will have its porous or capillary material easily and cheaply renewable so that it can be maintained in a highly efficient condition at all times.

Another object is to shield the cooling compartment so that it will not be affected by direct radiation of sunlight or of heat radiated from surrounding objects, and so that a constant natural circulation of air over the moist capillary material will be produced regardless of the condition of movement of the air in the room.

A further object is to provide a cooler in which the waste water which is ordinarily thrown away is utilized for moistening the capillary material, evaporation from which cools the drinking water.

Other objects and advantages of this invention will be apparent from the following detailed description of a preferred embodiment of the invention when read in connection with the accompanying drawing, in which—

Figure 1 is an elevational view partly in section of one form of the invention;

Figure 2 is a sectional view in the plane II, II in Figure 1; and

Figure 3 is a detail sectional view in the plane III, III of Figure 2.

Referring to Figure 1, a stand 10 of conventional type is provided which may be made of three channel section steel legs 11 tied together with a flat steel triangular brace 12 as shown. Attached to the upper ends of leg 11, either by riveting or welding, is a hollow shield 13 which is preferably constructed of light sheet steel. The shield may be of circular section or it may be of any desired shape, for example, it may be of a roughly triangular form as illustrated in the drawing, where the cooler is to be set in a corner of a room. The shield 13 is open at the bottom and is provided with a number of openings 14 near the top. A light sheet metal cover 15 is flanged as at 16 to fit over the top of the shield and has a circular opening 17 in the center thereof for the reception of an impervious cylindrical water cooling jar or container 18, which is preferably made of glass or porcelain.

Water container 18 is supported from the edge of the circular aperture in cover 15 by an outwardly flaring neck 19. The bottom of container 18 may be flat or may be provided with a sediment basin 20. Immediately above the sediment basin or, in the case of a flat bottomed jar, a short distance above the bottom, a hole is provided in the wall of the jar in which a flanged, internally and externally threaded metal bushing 22 is secured by means of a nut 23 and suitable rubber gaskets 24 and 25.

A conventional push button type of faucet 26 extends through a hole 27 in the shield 13 and is screwed into the bushing 22.

A water supply bottle 29, which is preferably the five-gallon bottle almost universally used by the dispensers of bottled drinking water is inverted into the top of the cooling jar 18 and rests on the flaring neck 19. Due to the inherent roughness and eccentricity of the bearing surfaces between the neck 19 and the supply bottle 29, sufficient space is left for air to enter the top of the jar 18 and thence into bottle 29 to take the place of the water flowing from bottle 29 into the cooling jar 18.

Below the cooling jar 18 and supported from the frame 10 by three metal clips 31, 32 and 33, is a water pan 34. Attached to, and forming a part of the pan 34 is a catch basin 35 which projects outwardly below the faucet 26 to catch any water which may be spilled during the process of drawing from faucet 26, or which may be returned from a partially emptied drinking cup. This basin also provides a convenient place for setting a drinking glass or cup when it is not in use. All water emptied into the catch basin 35 of course finds its way into the pan 34. As stated above, pan 34 is supported by clips 31, 32, and 33 attached to the respective legs 11 of the stand.

The two front clips 31 and 32 are single clips extending only below the rim of the pan 34, but the rear clip 33 is preferably split to provide a groove in which the edge of the pan fits, thus preventing any tipping of the pan and basin 35 due to the weight of a drinking glass or other object that may be set in the catch basin 35. Pan 34, however, sets loosely on supports 31 and 32 and in the slot in extension 33 so that the catch basin 35 can be moved to one side, by rotating the entire pan 34, to permit filling a pitcher or receptacle too high to be inserted between the faucet 26 and the bottom of catch basin 35.

Surrounding the cooling jar 18 is a cylinder 36 of blotting paper, felt, knit, or woven fabric or the like, the lower end of which dips into the water pan 34. The cylinder 36 may be made in the form of a flat sheet with a suitable hole for the insertion of the faucet 26, and may be wrapped around the jar and fastened by one or more turns 37 of wire, or by rubber bands, or by suitable clips.

The function of cylinder 36 is to absorb and evaporate water for cooling the outside of the jar 18 and its material, arrangement, and method of attachment may be varied widely.

As the cylinder extends substantially to the bottom of pan 34, it will absorb water therefrom by capillary attraction as long as there is any water in pan 34. The pan is preferably kept about one-third full of water. If the normal wastage from faucet 26 and from partially emptied drinking glasses is insufficient to maintain the level in pan 34, additional water may be supplied thereto through catch basin 35 from any desired source. It should be noted that if cylinder 36 becomes contaminated by the accumulation of mold or algæ, or from any other cause, it can be easily and cheaply replaced by a new cylinder.

The cooler as described above operates as follows:

The jar 18 and water pan 34 being empty, a bottle of water 29 is procured and quickly inverted into the top of jar 18. The water in the jar will thereupon run out until the level in the jar reaches the mouth of the bottle, air bubbling up through the water in bottle 29 to displace the water. When the water in jar 18 reaches the mouth of bottle 29, a seal is formed preventing the ingress of further air into the bottled water, and the flow of water from the bottle is stopped.

The pan 34 is then filled about half full with ordinary tap water, which rises in the porous cylinder 36 by capillary action until the entire cylinder is damp. The evaporation of the water from the cylinder 36 reduces its temperature substantially below that of the surrounding air and the cool cylinder absorbs heat from the water in the jar 18 until the water is substantially at the same temperature as the cylinder. At the same time, the air surrounding the cylinder is cooled by the evaporation of the water therefrom, causing it to become more dense and flow down between the cylinder 36 and the shield 13 and out of the open bottom of the shield, warm air entering to take the place of this cooled air through the openings or louvers 14. This circulation of air through the space between the cylinder 36 and the shield 13 continues as long as the air in the room is warmer than the shield, and thus provides continuous automatic air circulation.

It has been found that a cooler made and operated as outlined above maintains a water temperature at least 3 degrees F. cooler than the conventional unshielded porous jar type of cooler, which demonstrates it to be much more efficient.

Furthermore, the cooler is more attractive in appearance and is completely free from the disadvantages of exposed porous receptacles, namely, souring, efflorescence of salts contained in the porous material, and the accumulation of algæ and bacteria growth which are difficult to remove. It also is cheaper to operate as the cooling water is supplied by the waste from partially emptied drinking cups or by tap water from the usual piped supply.

I claim:

1. A water cooler comprising a reservoir of water-tight material, a casing of water-absorbent material surrounding said reservoir and in contact therewith, and a second, separate reservoir positioned below said first reservoir, and detached therefrom, whereby it may be removed for cleaning or filling independently of said first reservoir, said casing of water-absorbent material extending into said second reservoir.

2. A water cooler comprising a reservoir of water-tight material, a casing of water-absorbent material surrounding said reservoir and in contact with the outer surface thereof, a second, separate reservoir positioned below said first reservoir, and detached therefrom, whereby it may be removed for cleaning or filling independently of said first reservoir, said casing of capillary material extending into said second reservoir, and a shield surrounding and spaced from said water absorbent casing for facilitating the circulation of air thereover.

3. A water cooler comprising a reservoir of water-tight material having an outwardly extending flange, a casing of capillary material surrounding said reservoir in contact with the outer surface thereof, a separate reservoir positioned below said first reservoir, said casing of capillary material extending into said second reservoir, a stand for supporting said water cooler comprising a plurality of supporting members, a shield surrounding said first reservoir and secured to said supporting members, a cover for said shield having a central opening therein, said first reservoir being positioned within the opening in said cover and supported from the edge thereof by its outwardly extending flange, and separate means on said supporting members for supporting said second reservoir.

4. In combination, a water cooler jar of impermeable material, a support therefor, said support comprising a shield spaced from said jar and adapted to allow circulation of air therearound, a porous sleeve closely surrounding said jar and extending downwardly below the bottom thereof, and a pan supported below and extending entirely beneath said jar and adapted to receive the lower edge of said porous sleeve.

5. In combination, a cylindrical water cooler jar of impermeable material, a support therefor, said support comprising a shield spaced from said jar and adapted to allow circulation of air therearound, a porous sleeve closely surrounding the cylindrical wall of said jar and extending downwardly below the bottom thereof, and a removable pan supported below and extending entirely beneath said jar and adapted to receive the lower edge of said porous sleeve.

6. In combination, a water cooler jar of impermeable material, a support therefor, said support comprising a shield spaced from said jar and adapted to allow circulation of air therearound, a porous sleeve of water absorbent material closely surrounding the wall of said jar and extending downwardly below the bottom thereof, and a removable pan supported below and extending entirely beneath said jar and adapted to receive the lower edge of said porous sleeve, said shield and the rim of said pan forming a substantially annular opening through which said air circulation may occur.

7. In combination, a cylindrical water cooler jar of impermeable material, a support therefor, said support comprising a shield spaced from said jar and adapted to allow circulation of air therearound, a porous sleeve of water absorbent material closely surrounding the cylindrical wall of said jar and extending downwardly below the bottom thereof, a faucet fitting extending outwardly from said jar through said sleeve and said shield, and a removable pan supported below and extending entirely beneath said jar and adapted to receive the lower edge of said porous sleeve, said pan provided with an outwardly extending catch basin adapted to be positioned beneath said faucet.

8. In combination, a water cooler jar of impermeable material, a support therefor, said support comprising a shield spaced from said jar and adapted to allow circulation of air therearound, a porous sleeve closely surrounding said jar and extending downwardly below the bottom thereof, a faucet fitting extending outwardly from said jar through said sleeve and said shield, and a removable pan supported below and extending entirely beneath said jar and adapted to receive the lower edge of said porous sleeve, said pan provided with an outwardly extending catch basin adapted to be positioned beneath said faucet, and a rim by which said pan is aligned in said cooler support.

9. In combination, a water cooler jar of impermeable material, a support therefor, said support comprising a shield spaced from said jar and adapted to allow circulation of air therearound, a porous sleeve closely surrounding said jar and extending downwardly below the bottom thereof, and a pan supported below said jar and adapted to receive the lower edge of said porous sleeve, said pan providing the only receptacle required beneath said jar to receive water therefrom.

10. In combination, a water cooler jar of impermeable material, a support therefor, said support provided with a shield spaced from said jar and adapted to allow circulation of air therearound, a porous sleeve closely surrounding said jar and extending downwardly below the bottom thereof, a faucet fitting extending outwardly from said jar through said sleeve and said shield, and a pan supported below said jar, said pan provided with an outwardly extending catch basin adapted to be positioned beneath said faucet, and said pan providing the only receptacle required beneath said jar and said faucet to receive water therefrom.

Signed at Los Angeles, California, this 6th day of July, 1931.

RICHARD C. WOLFE.